United States Patent [19]

Marlett

[11] Patent Number: 4,478,813
[45] Date of Patent: Oct. 23, 1984

[54] PRODUCTION OF COMPLEX BERYLLIUM HYDRIDES

[75] Inventor: Everett M. Marlett, Baton Rouge, La.

[73] Assignee: Ethyl Corporation, Richmond, Va.

[21] Appl. No.: 600,776

[22] Filed: Apr. 16, 1984

[51] Int. Cl.³ ............................................. C01B 6/24
[52] U.S. Cl. .................................................... 423/644
[58] Field of Search ......................................... 423/644

[56] References Cited

U.S. PATENT DOCUMENTS 3,383,187  5/1968  Price et al. ......................... 423/644
3,647,399  3/1972  Ashby et al. ....................... 423/644

Primary Examiner—Herbert T. Carter
Attorney, Agent, or Firm—Donald L. Johnson; John F. Sieberth

[57] ABSTRACT

When subjecting a mixture of beryllium and an alkali metal aluminum complex of the formula $$MAlR_mH_n$$

wherein M is an alkali metal, R is a hydrocarbyl group, m is an integer from 1 to 4, n is an integer from 0 to 3, the total of m and n being 4, to a pressurized atmosphere of hydrogen and an elevated temperature, a solid reaction product is produced. This product, composed of $M_2BeH_4$ and other solid components, is mixed with an inert liquid diluent having a specific gravity above that of the $M_2BeH_4$ but below that of essentially all of the other solid components. A separation is effected in this diluent between the $M_2BeH_4$ and essentially all of such other solid components, and the $M_2BeH_4$ is recovered.

18 Claims, 1 Drawing Figure

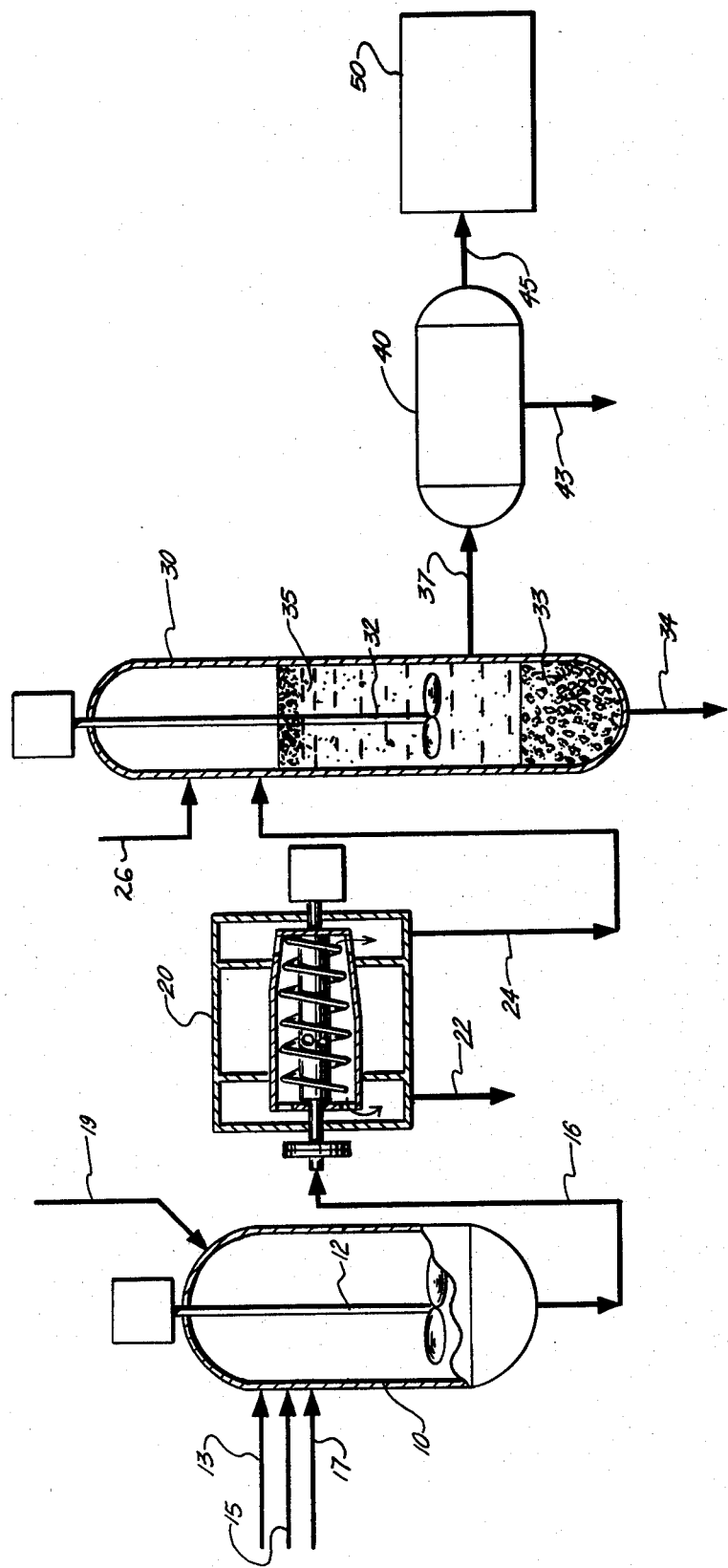

PRODUCTION OF COMPLEX BERYLLIUM HYDRIDES

INTRODUCTION

This invention relates to an improved process for the synthesis and recovery of alkali metal beryllium tetrahydrides, such as $Li_2BeH_4$, $Na_2BeH_4$, and the like

BACKGROUND

U.S. Pat. No. 3,647,399 to Ashby and Kobetz describes the first successful synthesis of the alkali metal beryllium tetrahydrides. The process they employed involves the reaction of a beryllium dialkyl, $BeR_2$ (R=alkyl of 1 to 10 carbon atoms), with a compound of the formula $MAlR_3H$, $MAlR_2H_2$, or a mixture of both such compounds (M=alkali metal).

A more desirable process for the synthesis of alkali metal beryllium tetrahydrides involves subjecting a mixture of beryllium and an alkali metal aluminum complex of the formula $$MAlR_mH_n$$

wherein M is an alkali metal, R is a hydrocarbyl group, m is an integer from 1 to 4, n is an integer from 0 to 3, the total of m and n being 4, to a pressurized atmosphere of hydrogen and an elevated temperature at which alkali metal beryllium tetrahydride of the formula $M_2BeH_4$ is produced. Such a process is described in detail in copending application Ser. No. 566,193, filed Dec. 28, 1983 by Roy J. Laran and assigned to the same assignee as the assignee of the present application.

THE DRAWING

The Figure of the Drawing depicts schematically one preferred process sequence of this invention.

THE INVENTION

The present process represents an improvement in the process set forth in the foregoing copending application, all disclosure of which is incorporated herein by reference as if fully set forth in the present disclosure.

More particularly, when the process of the copending application is carried out either with or without an innocuous reaction diluent a solid reaction product is formed. This product is composed of dialkali metal beryllium tetrahydride, $M_2BeH_4$, and other solid components such as alkali metal aluminum complexes ($MAlR_mH_n$), alkali metal hydride (MH), metallic beryllium, metallic aluminum, and the like.

In accordance with this invention the solid reaction product is mixed with an inert liquid hydrocarbon or other inert diluent having a specific gravity above that of the $M_2BeH_4$ but below that of essentially all of the other solid components of the solid reaction product (i.e., except for beryllium hydride, $BeH_2$, if present in the reaction product), and in this diluent a separation is effected between the $M_2BeH_4$ and such other solid components. This makes possible the facile isolation and recovery of the $M_2BeH_4$.

To illustrate, when the reaction involves pressure hydrogenating a mixture of, say, lithium aluminum tetraethyl and a finely-divided beryllium-titanium alloy, the solid reaction product normally will contain the following components (the approximate densities of which are shown in parentheses):

$Li_2BeH_4$ (0.70 g/cc)
$LiAlH_4$ (0.86~0.92 g/cc)
LiH (0.78~0.82 g/cc)
$BeH_2$ (0.65 g/cc)
Be (1.85 g/cc)
Al (2.70 g/cc)
Ti (4.50 g/cc)

By admixing this product with an inert diluent having a specific gravity between about 0.72 and about 0.78~0.80 gram per milliliter, an operation preferably conducted with an initial period of agitation followed by a period of standing in the quiescent state, the desired product ($Li_2BeH_4$) becomes physically separated from essentially all of the other solid components which settle from the diluent. Thus the desired product is readily recovered, e.g., by decanting off the upper portion of the diluent containing the $Li_2BeH_4$ (and $BeH_2$) solids. If desired the diluent may then be removed from the $Li_2BeH_4$, e.g., by filtration, centrifugation, vacuum distillation, or the like.

When the same procedure is utilized in the production and recovery of $Na_2BeH_4$ by pressure hydrogenation of, say, a beryllium-titanium alloy and $NaAlEt_4$ or $NaAlEt_3H$ or $NaAlEt_2H_2$ the solid reaction product will usually contain the following components (approximate densities again shown in parentheses):

$Na_2BeH_4$ (0.9 g/cc)
$NaAlH_4$ (1.27 g/cc)
NaH (1.36 g/cc)
$BeH_2$ (0.65 g/cc)
Be (1.85 g/cc)
Al (2.70 g/cc)
Ti (4.50 g/cc)

Thus in this case the specific gravity of the diluent used for effecting the separation should fall within the range of from about 0.92 to about 1.2 and preferably from about 0.95 to about 1.05 gram per milliliter.

A few illustrative examples of inert diluents which may be used in effecting the above separations include the following (approximate specific gravities shown in parentheses):

n-decane (0.726)
2,3,3-trimethylpentane (0.726)
methylcyclohexane (0.769)
m-propyltoluene (0.86)
m-xylene (0.864)
toluene (0.866)
tetrahydronaphthalene (0.87)
o-xylene (0.88)
1,2,3,4-tetramethylbenzene (0.905)
1-methylnaphthalene (1.025)
o-nitrotoluene (1.16)
nitrobenzene (1.2)

If desired, the separations may be effected at below or above room temperature, although ordinary ambient temperature conditions are preferred.

If heat is applied to the system during the separation step, convection currents and the like should be avoided.

Besides providing a very simple way of effecting an otherwise difficult separation and recovery operation, this invention has the advantage of keeping $BeH_2$ coproduct together with the dialkali metal beryllium tetrahydride product, both such materials having similar properties and uses and both usually being very desirable products. $BeH_2$ also can be separated in a second step from a mixture of the two by using a hydrocarbon diluent with specific gravity less than 0.70 g/cc, such as n-pentane, n-hexane, or the like.

The beryllium employed in the process is preferably in sub-divided form such as flakes, chips, turnings, ribbon, powder, or the like. It may be used in relatively pure form. However in accordance with a preferred embodiment of this invention, the beryllium is utilized in the form of a beryllium-Group IVB metal alloy such as beryllium-titanium, beryllium-zirconium, beryllium-hafnium, beryllium-titanium-zirconium, beryllium-zirconium-hafnium, beryllium-titanium-zirconium-hafnium or like alloys, provided the alloy contains a sufficient quantity of beryllium to enable the desired reaction to take place. Preferred alloys contain 50 weight percent or more of beryllium.

It is believed that the Group IVB metal, especially titanium, exerts a distinct reaction promoting or catalytic effect and thus greatly accelerates the formation of the desired dialkali metal beryllium tetrahydrides during the pressure hydrogenation.

In addition, the presence of the Group IVB metal in an alloy with beryllium results in the presence in the reaction product of dense metallic particles (e.g., unreacted beryllium-Group IVB metal alloy, as well as the Group IVB metal itself). The high density of such particles (4.5 g/cc for titanium, 6.4 g/cc for zirconium, and 11.4 g/cc for hafnium) provides a relatively rapid rate of settling in the hydrocarbon diluent and this not only enhances the desired separation but enables these valuable Group IVB metal-containing metallic particles to be collected in relatively pure form (e.g., by allowing the settling to occur in a tall column whereby the particles of greatest density (e.g., Ti, Zr or Hf) settle even more rapidly than the other particles that settle to the bottom.

The alkali metal aluminum complexes useful in the process comprise the alkali metal aluminum hydrocarbyl trihydrides, $MAlRH_3$; the alkali metal aluminum dihydrocarbyl dihydrides, $MAlR_2H_2$; the alkali metal aluminum trihydrocarbyl hydrides, $MAlR_3H$; the alkali metal aluminum tetrahydrocarbyls, $MAlR_4$; and mixtures of any two or three or all four of these. The hydrocarbyl groups, R, may contain any suitable number of carbon atoms and may be aliphatic, cycloaliphatic, and/or aromatic. R may also be any suitably inert heterocyclic group, (groups in which the hetero atom(s) may be nitrogen, oxygen, etc.) or R may be any other inert substituted or unsubstituted cyclic or acyclic organic group which does not interfere with the desired reaction.

Exemplary hydrocarbyl compounds of this type include lithium aluminum ethyl trihydride, sodium aluminum butyl trihydride, potassium aluminum methyl trihydride, lithium aluminum phenyl trihydride, sodium aluminum cyclohexyl trihydride, sodium aluminum benzyl trihydride, potassium aluminum octadecyl trihydride, lithium aluminum phenethyl trihydride, lithium aluminum dimethyl dihydride, sodium aluminum dipentyl dihydride, potassium aluminum diethyl dihydride, sodium aluminum bis(p-tolyl) dihydride, sodium aluminum bis(cyclopentyl) dihydride, sodium aluminum dibenzyl dihydride, potassium aluminum bis(hexadecyl) dihydride, lithium aluminum bis(phenethyl) dihydride, lithium aluminum ethyl methyl dihydride, lithium aluminum trimethyl hydride, sodium aluminum tripropyl hydride, potassium aluminum triethyl hydride, sodium aluminum tris(p-ethylphenyl) hydride, sodium aluminum bis(cyclopentyl) ethyl hydride, sodium aluminum tribenzyl hydride, potassium aluminum tris(tetradecyl) hydride, lithium aluminum tris(cyclopropylcarbinyl) hydride, lithium aluminum tetraethyl, lithium aluminum tetrabutyl, sodium aluminum tetrabutyl, potassium aluminum tetramethyl, lithium aluminum tetraphenyl, sodium aluminum tetracyclohexyl, sodium aluminum dibenzyl dimethyl, potassium aluminum tetraoctadecyl, lithium aluminum phenethyl triethyl, and the like. Sodium aluminum tetraethyl and equivalent sodium aluminum tetraalkyls, as well as their lithium counterparts are the preferred reactants.

The relative proportions between the beryllium and the alkali metal aluminum complex are not critical. However since the amount of the desired alkali metal beryllium tetrahydride formed is normally limited by the amount of the alkali metal aluminum complex employed, it is preferred to use this reactant in excess. For best results it is preferred to employ at least two gram moles of the alkali metal aluminum complex per gram equivalent of beryllium used.

It is desirable and convenient to use an excess of hydrogen.

Hydrogen pressures of at least about 1,000 psig will normally be employed, although in some cases reaction may proceed at lower pressures. Preferably the atmosphere is composed essentially entirely of dry hydrogen, although mixtures of hydrogen and other suitable gaseous materials, such as nitrogen, argon, etc., may be used if desired. Temperatures in the range of about 100° to about 350° C., and preferably in the range of about 125° to about 275° C., may be used. On the basis of available information, there is nothing critical about these reaction conditions provided of course that in any given case the pressure and temperature conditions selected result in the formation of the desired alkali metal beryllium tetrahydride and do not cause its decomposition.

The reaction may be conducted in bulk (i.e., no diluent is introduced into the reaction system). However it is deemed preferable to carry out the reaction in a suitable innocuous liquid diluent such as a hydrocarbon. Alkanes, cycloalkanes and aromatics are desirable materials for this use.

Use of agitation to insure intimate contact among the reaction components is recommended.

The Drawing illustrates in schematic fashion one preferred way by which the process of this invention may be practiced. Into a pressure reactor 10 equipped with an agitator 12 and heating means (not shown) are charged under an atmosphere of dry nitrogen, finely divided beryllium metal 13 (preferably in the form of an alloy such as Be-Ti), an innocuous essentially anhydrous diluent 15 such as toluene, alkali metal aluminum complex 17 such as $LiAlEt_4$, $NaAlEt_4$, or $KAlEt_4$ and the sealed reactor 10 is pressurized with hydrogen 19 and heated with agitation to a suitable reaction temperature, e.g., 150° C. After a reaction period of 18 hours the contents of reactor 10 are transferred (as indicated by line 16) in the absence of moisture and air to centrifuge 20. The reaction solution, which comprises the innocuous diluent and hydrocarbon-soluble reaction coproducts such as unreacted alkali metal aluminum complex and derivatives thereof (e.g., $Et_nAlH_{3-n}$ where n is 3 or less), is discharged as at 22. The solid reaction product discharged from centrifuge 20 as at 24 is transferred to settling tower 30 containing an anhydrous inert diluent of appropriate specific gravity introduced at 26. The resultant solids/diluent mixture is agitated in tower 30 by means of stirrer 32 to insure that the solids are well dispersed in the diluent. The stirrer 32 is turned off and a physical separation between the solid phases is caused to take place in the tower, the solids of specific gravity greater than that of the diluent settle to the bottom as at 33 whereas the solids of specific gravity less than that of the diluent (e.g., $Li_2BeH_4$, $Na_24$, $K_2BeH_4$, $BeH_2$, etc.) rise to the top as at 35.

The dense settled solids and a portion of the diluent are withdrawn from the bottom of tower 30 as at 34, and the less dense solids and a portion of the diluent in and on which they are suspended are transferred (as indicated by line 37) under anhydrous, air-free conditions to a solid-liquid separator 40 such as a centrifuge, filter, vacuum still or the like. The diluent is separated and removed as indicated by line 43 and the desired product solids composed predominantly of $M_2BeH_4$ are recovered as indicated by line 45 and, if desired, are subjected to drying at 50 under suitable anhydrous, air-free conditions, preferably at a suitably elevated temperature such as 50° to 150° C. in vacuo or at atmospheric pressure.

The alkali metal beryllium tetrahydrides are useful as portable sources of hydrogen gas and as reducing agents in a variety of chemical synthesis reactions. Other known uses for the materials are referred to in U.S. Pat. No. 3,647,399 to Ashby and Kobetz, the disclosure of which is incorporated herein.

This invention is susceptible to considerable variation in its practice in accordance with the true spirit and scope of the ensuing claims.

I claim:

1. In a process which comprises subjecting a mixture of beryllium and an alkali metal aluminum complex of the formula $$MAlR_mH_n$$

wherein M is an alkali metal, R is a hydrocarbyl group, m is an integer from 1 to 4, n is an integer from 0 to 3, the total of m and n being 4, to a pressurized atmosphere of hydrogen and an elevated temperature thereby producing a solid reaction product composed of $M_2BeH_4$ and other solid components, the improvement which comprises (i) mixing the solid reaction product and an inert liquid diluent having a specific gravity above that of the $M_2BeH_4$ but below that of essentially all of the other solid components, (ii) effecting in said diluent a separation between the $M_2BeH_4$ and essentially all of such other solid components, and (iii) recovering the $M_2BeH_4$.

2. The process of claim 1 wherein m is 4 and n is 0.

3. The process of claim 1 wherein M is lithium.

4. The process of claim 1 wherein M is sodium.

5. The process of claim 1 wherein M is lithium and said specific gravity is between about 0.72 and about 0.78 gram per milliliter.

6. The process of claim 1 wherein M is sodium and said specific gravity is between about 0.95 and about 1.05 gram per milliliter.

7. In a process which comprises subjecting a mixture of a beryllium-titanium alloy and an alkali metal aluminum complex of the formula $$MAlR_mH_n$$

wherein M is an alkali metal, R is a hydrocarbyl group, m is an integer from 1 to 4, n is an integer from 0 to 3, the total of m and n being 4, to a pressurized atmosphere of hydrogen and an elevated temperature thereby producing a solid reaction product composed of $M_2BeH_4$ and other solid components, the improvement which comprises (i) mixing the solid reaction product and an inert liquid hydrocarbon diluent having a specific gravity above that of the $M_2BeH_4$ but below that of essentially all of the other solid components, (ii) effecting in said diluent a separation between the $M_2BeH_4$ and essentially all of such other solid components, and (iii) recovering the $M_2BeH_4$.

8. The process of claim 7 wherein m is 4 and n is 0.

9. The process of claim 7 wherein M is lithium.

10. The process of claim 7 wherein M is sodium.

11. The process of claim 7 wherein M is lithium and said specific gravity is between about 0.72 and about 0.78 gram per milliliter.

12. The process of claim 7 wherein M is sodium and said specific gravity is between about 0.95 and about 1.05 gram per milliliter.

13. In a process which comprises subjecting an agitated mixture of an inert hydrocarbon diluent, a beryllium-titanium alloy and an alkali metal aluminum complex of the formula $$MAlR_mH_n$$

wherein M is an alkali metal, R is a hydrocarbyl group, m is an integer from 1 to 4, n is an integer from 0 to 3, the total of m and n being 4, to a pressurized atmosphere of hydrogen and an elevated temperature thereby producing a solid reaction product composed of $M_2BeH_4$ and other solid components in admixture with said diluent, the improvement which comprises (i) separating the solid reaction product from the diluent, (ii) forming a mixture of the solid reaction product and an inert liquid hydrocarbon diluent having a specific gravity above that of the $M_2BeH_4$ but below that of essentially all of the other solid components, (iii) effecting in said diluent a separation between the $M_2BeH_4$ and essentially all of such other solid components, and (iv) recovering the $M_2BeH_4$.

14. The process of claim 13 wherein m is 4 and n is 0.

15. The process of claim 13 wherein M is lithium.

16. The process of claim 13 wherein M is sodium.

17. The process of claim 13 wherein M is lithium and said specific gravity is between about 0.72 and about 0.78 gram per milliliter.

18. The process of claim 13 wherein M is sodium and said specific gravity is between about 0.95 and about 1.05 gram per milliliter.

* * * * *